US012626572B2

(12) United States Patent
Sommer et al.

(10) Patent No.: US 12,626,572 B2
(45) Date of Patent: May 12, 2026

(54) FLEXIBLE EMBEDDED SECURITY TAG

(71) Applicant: Sensormatic Electronics, LLC, Boca Raton, FL (US)

(72) Inventors: Olivier Bruno Sommer, Knoxville, TN (US); Lauri Johannes Huhtasalo, Tampere (FI); Iraj Ehtezazi Alamdari, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 27 days.

(21) Appl. No.: 18/339,122

(22) Filed: Jun. 21, 2023

(65) Prior Publication Data

US 2024/0038043 A1 Feb. 1, 2024

Related U.S. Application Data

(60) Provisional application No. 63/369,919, filed on Jul. 29, 2022.

(51) Int. Cl.

*G08B 13/16* (2006.01)
*G08B 13/24* (2006.01)
*G08B 15/00* (2006.01)

(52) U.S. Cl.

CPC ..... *G08B 13/2471* (2013.01); *G08B 13/2434* (2013.01); *G08B 13/2442* (2013.01)

(58) Field of Classification Search

CPC ............ E05B 73/0017; G08B 13/2434; G08B 13/2448; Y10T 70/5004; G06Q 20/203; G07G 3/003

See application file for complete search history.

(56) References Cited

U.S. PATENT DOCUMENTS

| | | | | |
|---|---|---|---|---|
| 5,942,978 | A * | 8/1999 | Shafer | E05B 73/0017 70/57.1 |
| 10,089,478 | B1 * | 10/2018 | Fraser | B42D 25/29 |
| 11,220,769 | B2 | 1/2022 | Forster | |
| 12,327,153 | B2 | 6/2025 | Carteaux et al. | |
| 2006/0290514 | A1 | 12/2006 | Sakama et al. | |
| 2008/0007409 | A1 * | 1/2008 | Ferry | B29C 43/305 264/238 |
| 2011/0114734 | A1 | 5/2011 | Tiedmann et al. | |
| 2012/0234921 | A1 | 9/2012 | Tiedmann et al. | |

(Continued)

FOREIGN PATENT DOCUMENTS

| | | | |
|---|---|---|---|
| CN | 213844177 | U | 7/2021 |
| CN | 213988039 | U | 8/2021 |

(Continued)

OTHER PUBLICATIONS

International Search Report and Written Opinion in PCT/US2023/069295, mailed Oct. 2, 2023, 14 pages.

*Primary Examiner* — Mirza F Alam
(74) *Attorney, Agent, or Firm* — ArentFox Schiff LLP

(57) ABSTRACT

A flexible security tag includes: an elongated inlay portion; a loop antenna mounted on the elongated inlay portion; an electrically-conductive member longitudinally extending across the elongated inlay portion, spaced apart from and inductively coupled to the loop antenna; and a radio frequency identifier (RFID) circuit mounted to the loop antenna. The flexible security tag is encapsulated within an elongated textile protective sleeve.

19 Claims, 13 Drawing Sheets

(56) References Cited

U.S. PATENT DOCUMENTS

| | | | | |
|---|---|---|---|---|
| 2014/0207670 | A1* | 7/2014 | Matotek | G06Q 20/3224 705/41 |
| 2015/0356845 | A1 | 12/2015 | Forster | |
| 2016/0019452 | A1 | 1/2016 | Forster | |
| 2016/0210547 | A1* | 7/2016 | Dekeyser | G06K 7/065 |
| 2018/0025601 | A1* | 1/2018 | Gao | G08B 13/246 340/572.1 |
| 2018/0350275 | A1* | 12/2018 | Milbrandt | G09F 3/04 |
| 2019/0385037 | A1* | 12/2019 | Robadey | H04B 5/26 |
| 2020/0285921 | A1 | 9/2020 | Chandramowle | |
| 2021/0082266 | A1 | 3/2021 | Chandramowle | |
| 2021/0209912 | A1 | 7/2021 | Claeys et al. | |
| 2023/0206739 | A1 | 6/2023 | Sommer et al. | |
| 2024/0095481 | A1 | 3/2024 | Rietzler | |
| 2024/0242058 | A1 | 7/2024 | Goodman et al. | |

FOREIGN PATENT DOCUMENTS

| | | | |
|---|---|---|---|
| DE | 2060871 | A1 | 7/1971 |
| DE | 2314132 | A1 | 6/1974 |
| DE | 2423200 | A1 | 11/1975 |
| DE | 2549207 | A1 | 5/1977 |
| DE | 2723445 | A1 | 1/1978 |
| EP | 0737503 | A1 | 10/1996 |
| EP | 2405054 | B1 | 2/2013 |
| IN | 1408 | | 8/2012 |
| IN | 4985 | | 2/2014 |
| IN | 8529 | | 12/2014 |
| JP | 3236614 | U | 3/2022 |
| KR | 20170132317 | A | 12/2017 |
| WO | 82/02472 | A1 | 8/1982 |
| WO | 82/02473 | A1 | 8/1982 |
| WO | 2005/125290 | A1 | 12/2005 |
| WO | 2009/101249 | A1 | 8/2009 |
| WO | 2011/109076 | A1 | 9/2011 |
| WO | 2012/126063 | A1 | 9/2012 |
| WO | 2020/181079 | A1 | 9/2020 |
| WO | 2021/108273 | A1 | 6/2021 |
| WO | 2024/026183 | A1 | 2/2024 |
| WO | 2025/054420 | A1 | 3/2025 |
| WO | 2025/136933 | A1 | 6/2025 |
| WO | 2025/137367 | A1 | 6/2025 |
| WO | 2025/137531 | A1 | 6/2025 |
| WO | 2025/151692 | A1 | 7/2025 |

* cited by examiner

FLEXIBLE EMBEDDED SECURITY TAG

CROSS-REFERENCE TO RELATED APPLICATION(S)

This application claims the priority of U.S. Provisional Application Ser. No. 63/369,919, entitled "FLEXIBLE EMBEDDED SECURITY TAG" and filed on Jul. 29, 2022, which is expressly incorporated by reference herein in the entirety.

FIELD

The present disclosure relates generally to security tags, such as an electronic article surveillance tag, which may be attached to or incorporated into an article, such as a textile or other items.

BACKGROUND

Electronic Article Surveillance (EAS) systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as a radio frequency identification (RFID) and/or an acousto-magnetic (AM) tag), also known as an EAS marker, that, when active, generates a response signal when passed through this interrogation zone. An antenna and receiver in the same or another "pedestal" detect this response signal and generate an alarm.

Additionally, permanent hidden/embedded tags in goods could be used for other purposes, such as, but not limited to circular economy applications (new business models like renting clothes, or selling secondhand clothes with known authenticity and pedigree). In many cases the same tag can be used for multiple purposes: security (anti-theft), circular economy, supply chain management, and inventory management.

One drawback of tagging goods with EAS markers and other security tags for purposes of theft prevention is that the tag itself is often visible to thieves. Shoplifters in many cases are able to locate the EAS marker and simply remove, disable, or shield an EAS marker element to evade detection by the detection system.

Thus, improvements in security tags are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for providing security tags that are inserted into apparel items.

In an aspect, a security tag includes: an elongated inlay portion; a loop antenna mounted on the elongated inlay portion; an electrically-conductive member longitudinally extending across the elongated inlay portion, spaced apart from and inductively coupled to the loop antenna; and a radio frequency identifier (RFID) circuit mounted to the loop antenna. The security tag is encapsulated within an elongated textile protective sleeve.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a security tag, such as a passive RFID tag, which is designed to be physically capable of withstanding tensile, compressive, and/or abrasive forces which occur while positioning and affixing the security tag into an item, yet is sufficiently flexible and/or soft so as to not be noticeable to a person wearing the item. Additionally, in an aspect, the security tag, which optionally may be water-resistant, is configured to be incorporated into an interface between different layers of an item, such as a garment or article of clothing. Moreover, the security tag can be discreetly disposed within the item so as to be concealed from view.

Turning now to the figures, example aspects are depicted with reference to one or more components described herein, where components in dashed lines may be optional.

Figure 1:
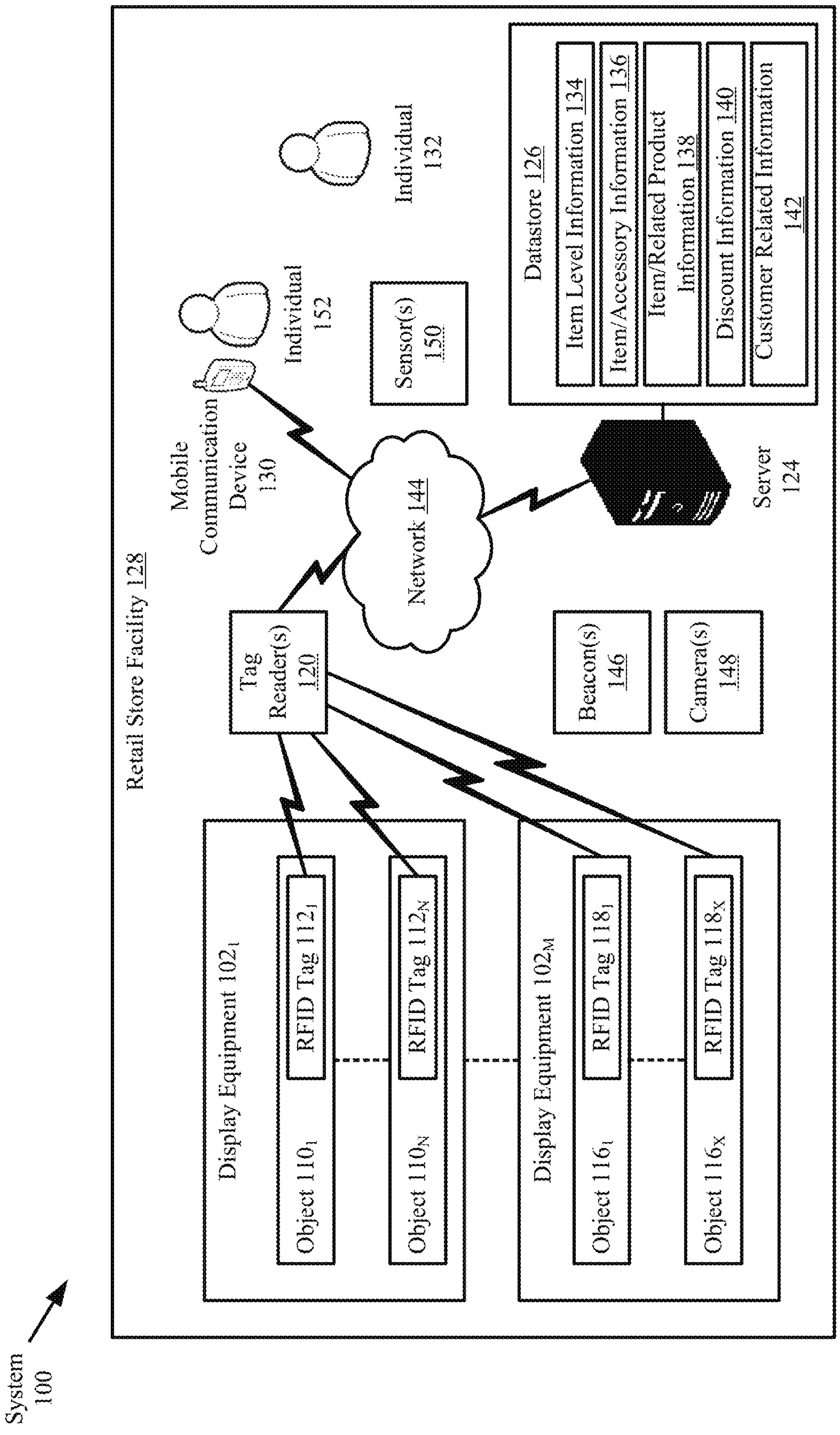
FIG. 1 is an illustration of an illustrative architecture for a system, according to some present aspects.

Referring now to FIG. 1, there is provided a schematic illustration of an illustrative system 100 that is useful for understanding the present aspects. The present aspects are described herein in relation to a retail store environment. The present aspects are not limited in this regard and can be used in other environments. For example, the present aspects can be used in distribution centers, factories, and other commercial environments. Notably, the present aspects can be employed in any environment in which objects and/or items need to be located and/or tracked.

The system 100 is generally configured to allow: (a) improved inventory counts and surveillance of objects and/or items located within a facility, and (b) improved customer experience. As shown in FIG. 1, system 100 comprises a Retail Store Facility ("RSF") 128 in which display equipment $\mathbf{102}_1$-$\mathbf{102}_M$ is disposed. The display equipment is provided for displaying objects (or items) $\mathbf{110}_1$-$\mathbf{110}_N$, $\mathbf{116}_1$-$\mathbf{116}_X$ to customers of the retail store. The display equipment can include, but is not limited to, shelves, article display cabinets, promotional displays, fixtures, and/or equipment securing areas of the RSF 128. The RSF 128 can also include emergency equipment (not shown), checkout counters, video cameras, people counters, and conventional EAS systems well known in the art, and therefore will not be described herein.

At least one tag reader 120 is provided to assist in counting and tracking locations of the objects $\mathbf{110}_1$-$\mathbf{110}_N$, $\mathbf{116}_1$-$\mathbf{116}_X$ within the RSF 128, and/or to perform a checkout process associated with a user purchasing a respective object. The tag reader 120 comprises an RFID reader configured to read RFID tags. Such a tag read may include the tag reader 120 receiving a unique identifier of a respective RFID tag 112, which may be associated with an identifier of the object 110 to which the RFID tag 112 is attached.

RFID tags $\mathbf{112}_1$-$\mathbf{112}_N$, $\mathbf{118}_1$-$\mathbf{118}_X$ are respectively attached to the objects $\mathbf{110}_1$-$\mathbf{110}_N$, $\mathbf{116}_1$-$\mathbf{116}_X$ as described below. This attachment may be achieved by a structural configuration of the RFID tag to enable the attachment. The RFID tags $\mathbf{112}_1$-$\mathbf{112}_N$, $\mathbf{118}_1$-$\mathbf{118}_X$ can alternatively or additionally comprise dual-technology tags that have both EAS and RFID capabilities as described herein. In examples of the technology disclosed herein, the RFID tag is sewn or otherwise affixed into an object 110, for example into an interface between layers of the fabric/cloth of the object 110, which may be clothing or which may be another retail item, such as a handbag, a backpack, and the like.

Notably, the tag reader 120 may be placed at a known location within the RSF 128, for example, at an exit/entrance. By correlating the RFID tag reads of the tag reader 120 and the known location of the tag reader 120 within the RSF 128, it is possible to determine the general location of objects $\mathbf{110}_1, \ldots, \mathbf{110}_N$, $\mathbf{116}_1, \ldots, \mathbf{116}_X$ within the RSF 128. The known coverage area of the tag reader 120 also facilitates object location determinations. Accordingly, RFID tag read information and tag reader location information is stored in a datastore 126. This information can be stored in the datastore 126 using a server 124 and network 144 (e.g., an intranet and/or the Internet). Additionally, the tag reader 120 or another computer device, such as but not limited to a point of sale terminal, may read a respective RFID tag 112 during a check-out or payment process and confirm that the object 110 to which the RFID tag 112 is attached is the object being paid for in the check-out or point of sale transaction.

System 100 may also comprise a Mobile Communication Device ("MCD") 130. MCD 130 includes, but is not limited to, a cell phone, a smart phone, a table computer, a personal digital assistant, and/or a wearable device (e.g., a smart watch). In accordance with some examples, the MCD 130 has a software application installed thereon that is operative to: facilitate the provision of various information 134-142 to the individual 152; and/or facilitate the sale or purchase transaction.

The MCD 130 is generally configured to provide a visual and/or auditory output of item level information 134, accessory information 136, related product information 138, discount information 140, and/or customer related information 142.

The MCD 130 can also be configured to read barcodes and/or the RFID tag 112. Information obtained from the barcode and/or RFID tag reads may be communicated from the MCD 130 to the server 124 via network 144. Similarly, the stored information 134-142 is provided from the server 124 to the MCD 130 via a network 144. The network 144 includes an intranet and/or the Internet.

Server 124 can be local to the facility 128 as shown in FIG. 1 or remote from the facility 128. It should be understood that server 124 is configured to: write data to and read data from datastore 126, RFID tags $\mathbf{112}_1$-$\mathbf{112}_N$, $\mathbf{118}_1$-$\mathbf{118}_X$, and/or MCD 130; perform language and currency conversion operations using item level information 134 and/or accessory information 136 obtained from the datastore 126, RFID tags $\mathbf{112}_1$-$\mathbf{112}_N$, $\mathbf{118}_1$-$\mathbf{118}_X$, and/or MCD 130 perform data analytics based on inventory information 134, tag read information, MCD tacking information, and/or information 134-142; perform image processing using images captured by camera(s) 148; and/or determine locations of RFID tags $\mathbf{112}_1$-$\mathbf{112}_N$, $\mathbf{118}_1$-$\mathbf{118}_X$ and/or MCDs 130 in the RSF 128 using beacon(s) 146, tag reader 120 or other devices having known locations and/or antenna patterns.

In some examples, one or more beacons 146 transmitting an RF signal (e.g., a second RF signal) other than the RFID interrogation signal are placed to cover a zone of interest (which in some cases may be also covered by a tag reader 120 placed to cover an RFID interrogation zone), e.g., at a portal (such as an entrance or exit) of the retail facility 128.

The server 124 updates the information 134-142 output from the MCD 130 and/or the tag reader 120 and/or any other terminal and/or point of sale device that interacts with the RFID tag 112. Such information updating can be performed periodically, in response to instructions received from an associate (e.g., a retail store employee 132), in response to a detected change in the item level 134, accessory 136, and/or related product information 138, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag 112/118. The sale price is then output from the MCD 130. It should be noted that the present aspects are not limited to the particulars of this example.

Although a single MCD 130 and/or a single server 124 is (are) shown in FIG. 1, the present aspects are not limited in this regard. It is contemplated that more than one computing device can be implemented. In addition, the present aspects are not limited to the illustrative system architecture described in relation to FIG. 1.

In some aspects, during operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information 134 may include, but is not limited to, one or more of first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second, and fourth information can be derived based on sensor data generated by sensors local to the RFID tag. In other words, in some cases, the RFID tags $\mathbf{112}_1$-$\mathbf{112}_N$, $\mathbf{118}_1$-$\mathbf{118}_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF 128, (c) detection of when the individual 152 is in proximity to an object to which an RFID tag 112/118 is coupled, (d) determination that an RFID tag 112/118 is being handled or moved by the individual 152 based on a time stamped pattern of MCD 130 movement and a timestamped pattern of RFID tag 112/118 movement, and/or (e) determination of an association of moving RFID tags 112/118 and the individual 152.

When a detection is made that an RFID tag 112/118 is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag 112/118 is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information 134, accessory information 136, and/or related product information 138.

In those or other scenarios, a sensor embedded in the RFID tag 112/118 detects when an individual 152 is handling the object in which the RFID tag 112/118 is inserted. When such a detection is made, the RFID tag 112/118 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information related to the product of interest. The present solution is not limited to the particulars of this scenario.

Referring to FIGS. 2-6, an example architecture for a security tag 200 is shown. RFID tags $\mathbf{112}_1$-$\mathbf{112}_N$, $\mathbf{118}_1$-$\mathbf{118}_X$ are the same as or similar to security tag 200. As such, the discussion of security tag 200 is sufficient for understanding the RFID tags $\mathbf{112}_1$-$\mathbf{112}_N$, $\mathbf{118}_1$-$\mathbf{118}_X$ of FIG. 1. In some implementations, security tag 200 may be configured to perform operations such as but not limited to: (a) minimize power usage so as to extend a power source's life (e.g., a battery or a capacitor), (b) minimize collisions with other tags so that the tag of interest can be seen at given times, and/or (c) optimize useful information within an inventory system (e.g., communicate useful change information to a tag reader)

Notably, the security tag 200 is designed to be relatively thin and relatively flexible so that it is hard to feel when inserted into an item (e.g., object $\mathbf{110}_1$, . . . , $\mathbf{110}_N$, $\mathbf{116}_1$, . . . , or $\mathbf{116}_X$ of FIG. 1), but sturdy enough to withstand a certain number (e.g., one or more) of wash cycles. The object can include, but is not limited to, an article of clothing.

Figure 2:
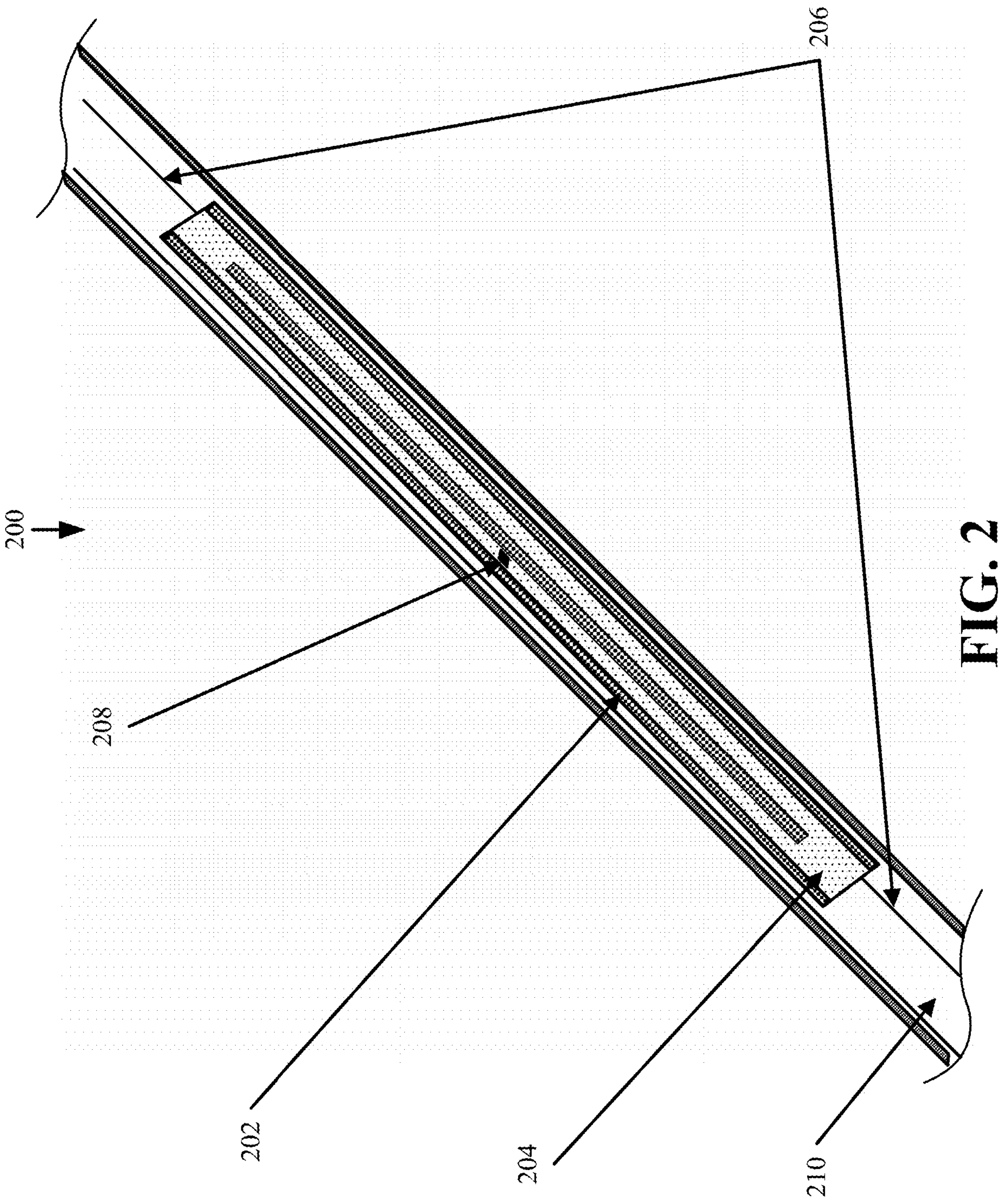
FIG. 2 is a partial cut-away isometric view of an example architecture for a portion of a tag, according to some present aspects.

Security tag 200 may include, for example, a semiconductor integrated circuit 208, e.g., an RFID chip, which provides the RFID-based functionality described above, electrically connected to a tunable antenna 204 that enables the circuit 208 to receive and/or transmit signals, and mounted to an inlay 202. The tunable antenna 204, such as a loop antenna as shown in FIG. 2, may be tuned to a desired operating frequency by adjusting the length of the antenna. The range of operating frequencies may vary. In one embodiment, for example, the loop antenna 204 may be tuned to operate within an RFID operating frequency.

The tunable antenna 204 of the security tag 200 may be formed as conductive trace(s) via etching, printing, or other patterning method. The conductive trace/layer may be, but is not limited to, aluminum, copper, silver, tin, or graphene.

The tunable antenna 204 may be designed so that the tag's operating frequency is in a range of 840-960 MHz (inclusive of 840 and 960), a range of 860-940 MHz (inclusive of 860 and 940), a range of 865-868 MHz (inclusive of 865 and 868), or a range of 902-928 MHz (inclusive of 902 and 928).

The tunable antenna 204 may additionally comprise an electrically conductive member 206 configured to electrically couple with the tunable antenna 204, such as via inductance. The conductive member 206 may longitudinally extend across substantially the entire length of the security tag 200. In other words, the longitudinal length of the conductive member 206 is greater than the longitudinal length of the inlay 202, which provides the security tag 200 with increased flexibility and a softer feel as compared to other security tags in which the inlay extends substantially the length of the tag. The electrically conductive member 206 may be fabricated by positioning an electrically conductive wire adjacent to the tunable antenna 204 mounted on the inlay 202, such as spaced apart from the tunable antenna 204, e.g., on an opposite side of the inlay 202.

Materials used for electrically conductive member 206 can include, but are not limited to, nylon, cotton, wool, polyester, or other synthetic materials coated by an electrically conductive material. However, in various implementations, the electrically conductive member 206 may be made of conductive wire, like copper wire, steel wire, and the like. In some implementations, the conductive member 206 may comprise several conductive threads that are spun together. In one exemplary implementation, the conductive member 206 may include one or more threads having required resistance/durability and tensile strength characteristics and one or more threads having required electrical conductivity characteristics. In an aspect, the conductive member 206 may comprise nylon coated with silver. In yet another aspect, the conductive member 206 may comprise a metallic stripe or a metallic foil, whereas said metallic stripe or said metallic foil is preferably made by die-cutting.

In some aspect, but not limited hereto, the conductive member 206 may extend along the security tag 200 in a longitudinal direction and may have a diameter around 100 microns.

Additionally, the security tag 200 further includes an elongated sleeve 210, which substantially encapsulates the inlay 202, the loop antenna 204, and the conductive member 206. The sleeve 210 may be formed of a fabric or a plastic material, and may be a single sheet wrapped around the internal components and sealed or fixed together on one side, or two opposing sheets sealed or fixed together on each side.

The inlay 202 to which the semiconductor integrated circuit 208 and the tunable antenna 204 are mounted may be a relatively thin, narrow, light-weight, recyclable and/or machine-washable substrate. In one aspect, the inlay 202 may be an elongated inlay 202 having a length substantially equal to or slightly greater than a length of the tunable antenna 204. In other words, as noted above, the longitudinal length of the inlay 202 is substantially less than the longitudinal length of the conductive member 206 and the security tag 202. In an aspect, the conductive member 206 may have a length substantially greater (approximately 2 times to 8 times greater) than a length of the inlay portion 202 and a length of the conductive trace(s) of the loop antenna 204. In an aspect, the longitudinal length of the elongated inlay portion 202 and the longitudinal length of the loop antenna may be substantially equal.

The inlay 202 can include, but is not limited to, any type of flexible material, such as but not limited to a Polyimide (PI), Polyethylene naphthalate (PEN), and/or a paper. In some aspects, the inlay 202 may comprise a polyester (e.g., PET) substrate. A thickness of the inlay 202 is selected so that the inlay 202 has a physical strength that allows a threshold amount of tension and/or compression to be maintained on the security tag 200 while attaching the tag to an object 110/116. For example, but not limited hereto, the thickness can have a value between approximately 10 um and approximately 200 um. It should be noted that additional layers may be added to the inlay 202 to protect the loop antenna 204 in the washing process. These additional layers may increase the thickness of the inlay 202 to at least 200 um. Further, for example but not limited hereto, a width of the inlay 202 can be between approximately 2.5 mm and approximately 5 mm, which is small enough so that the tag 200 is not felt by humans when inserted into an object. It should be understood that the present aspects are not limited to the particulars of this example.

In the present aspects, the security tag 200 may be flexible, bendable, stretchable, or otherwise configured and/or constructed to sustain deformations. Further, for example but not limited hereto, a width of the security tag 200 can be between 3.5 mm and 6 mm, and a length of the security tag 200 can be between 80 mm and 145 mm which is small enough so that the tag is not felt by humans when inserted into an item. The present aspects are not limited to the particulars of this example. Also, the flexibility of the security tag 200 allows for the security tag 200 to be constructed and arranged so that the aforementioned deformations do not negatively affect the functionality and operation of the electronic components disposed within the security tag 200. In some aspects, electronic components are positioned on one side off a center of the security tag 200, so that a stitching lane may be created for secure attachment of the security tag 200 to an article of clothing.

In some aspects, the security tag 200 may be manufactured to satisfy standards of environmental sustainability. For example, in some aspects, a natural-fiber fabric, recycled materials, or bio-based materials may be used as the inlay layer 202 (or as a portion of the inlay layer 202) so that the security tag 200 incorporates less plastic material than conventional security tags. For example, the security tag 200 may be manufactured using natural-fiber fabric substrates that are sustainable in nature, particularly if the fabric is non-polyester. Recycled materials may include, but are not limited to, recycled polyester or recycled paper, and biomaterials may include, but are not limited to, biopolymers and paper.

Figure 3:
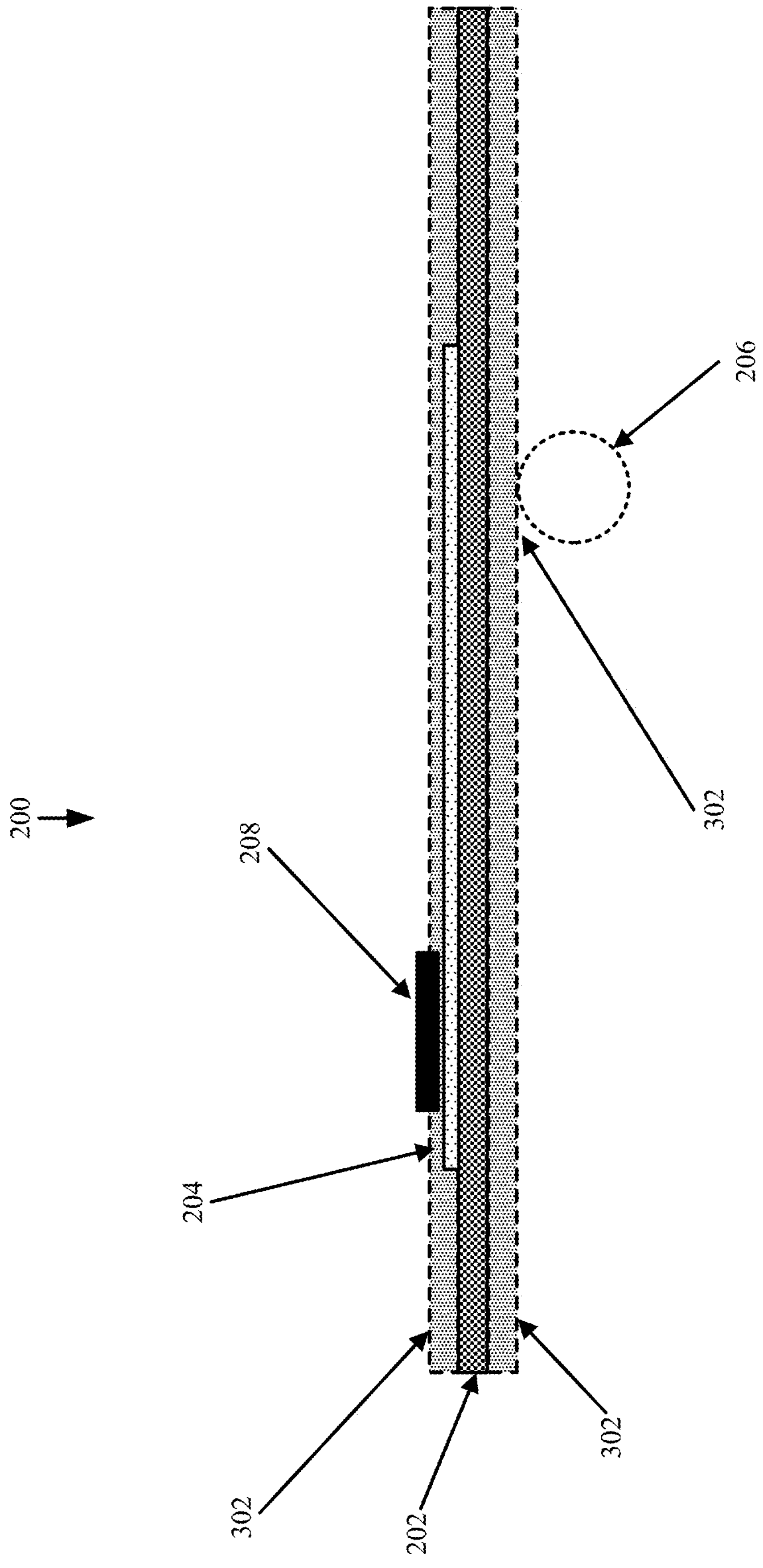
FIG. 3 is a side view of the example architecture of FIG. 2, according to some present aspects.
Figure 4:
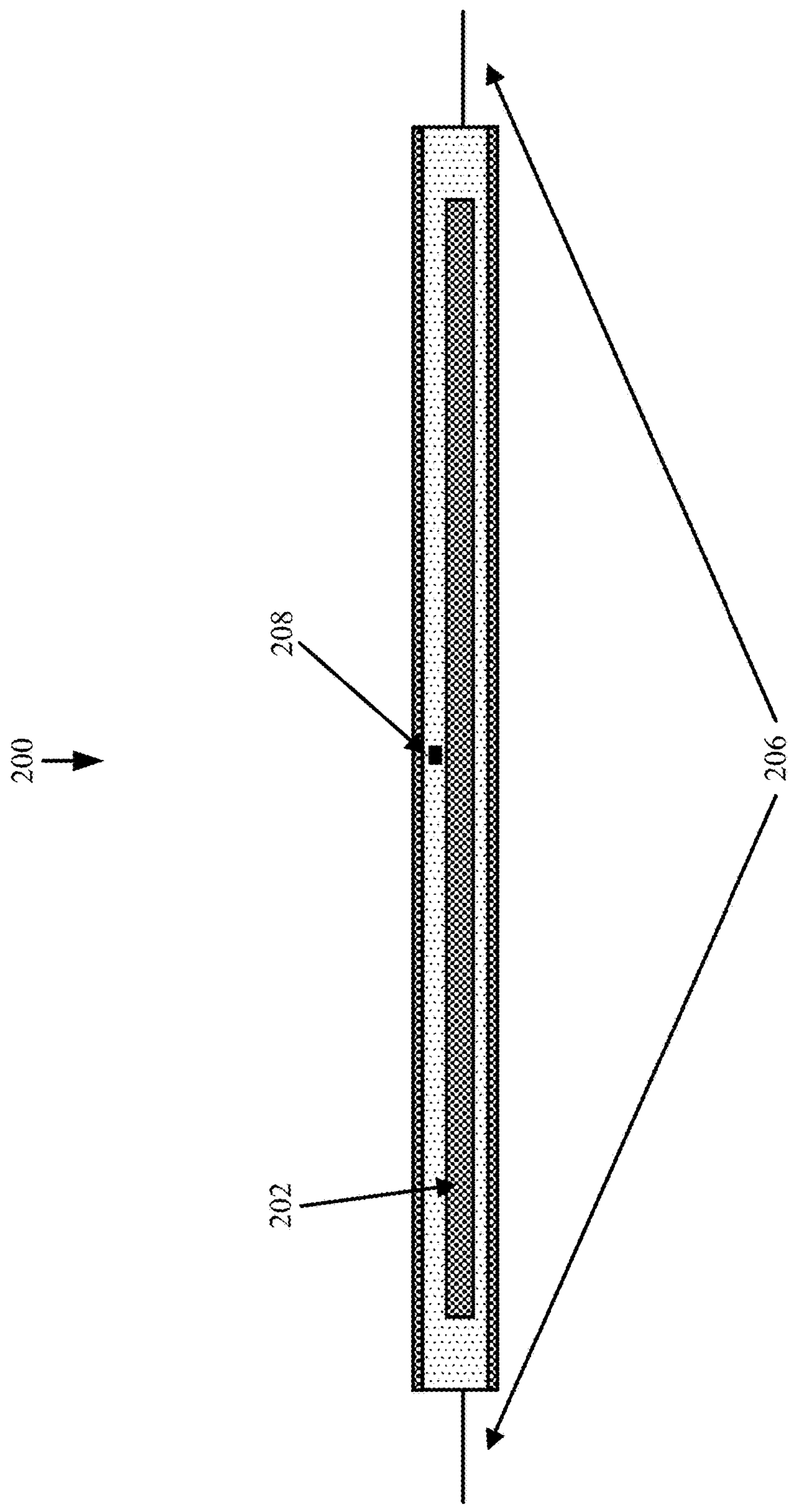
FIG. 4 is a top view of the example architecture of FIG. 2, according to some present aspects.
Figure 6:
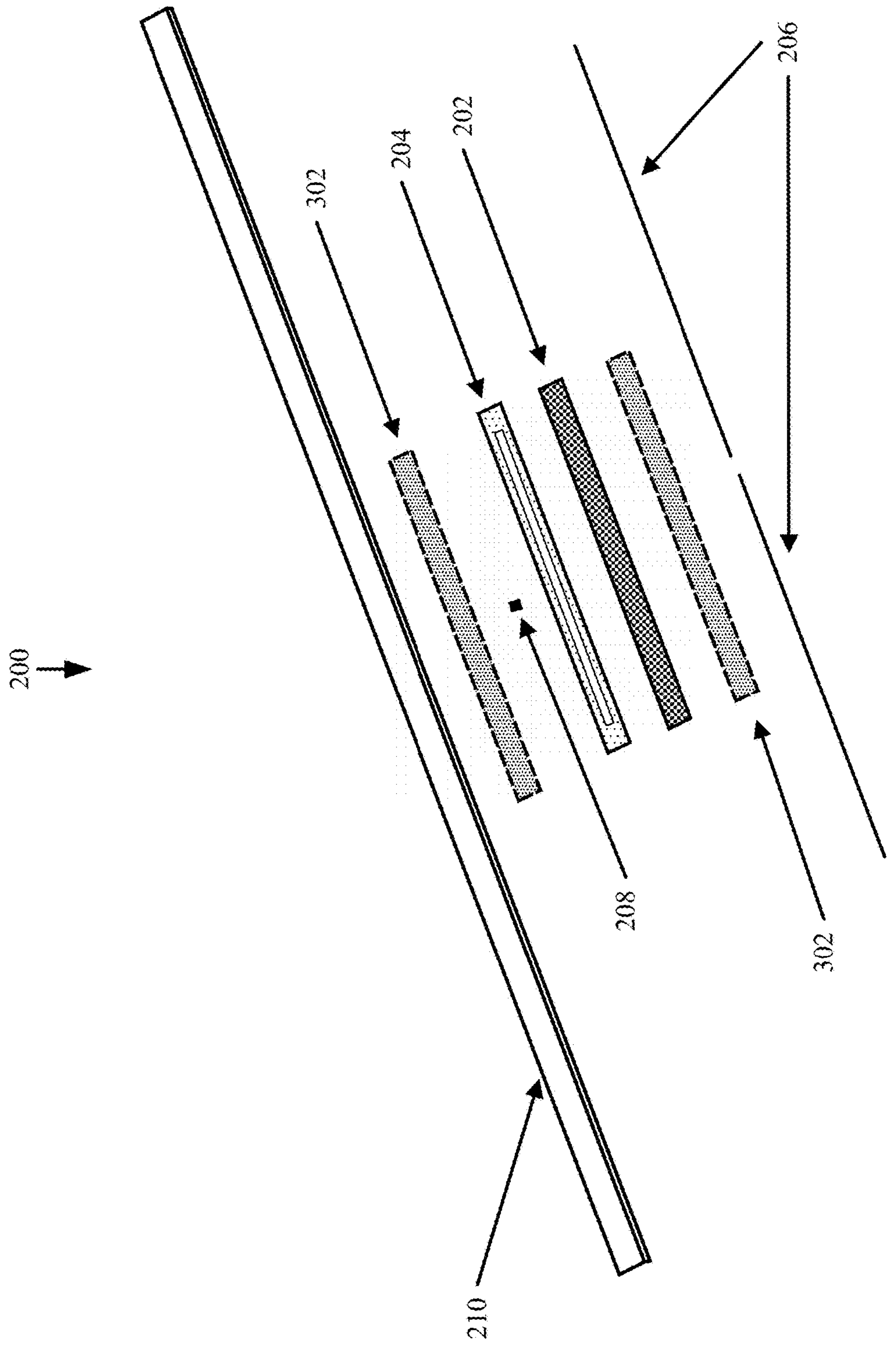
FIG. 6 is an exploded perspective view of the example architecture of FIG. 2, according to some present aspects.
Figure 7:
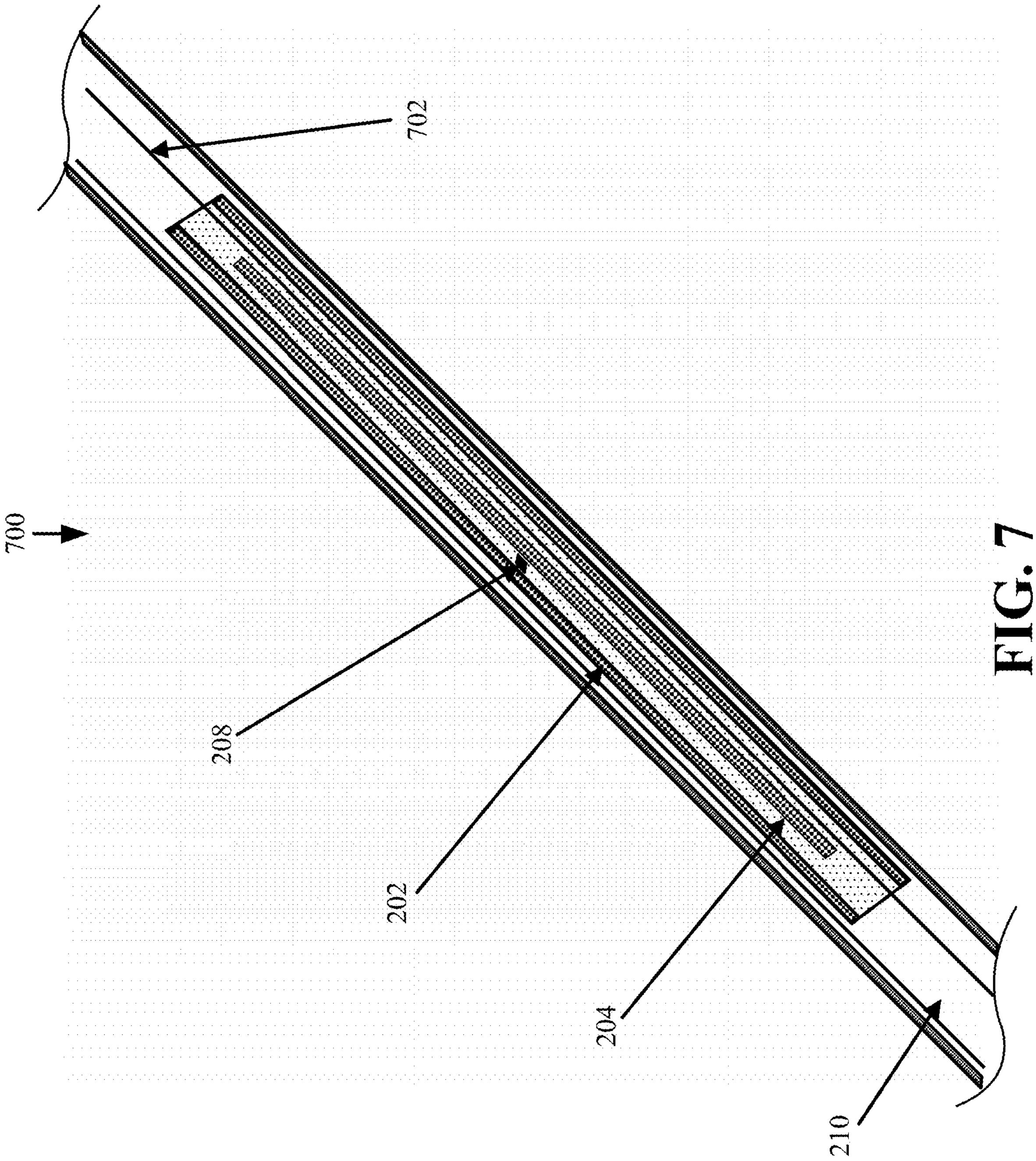
FIG. 7 is an isometric view of an alternative example architecture for a portion of a tag, according to some present aspects.
Figure 8:
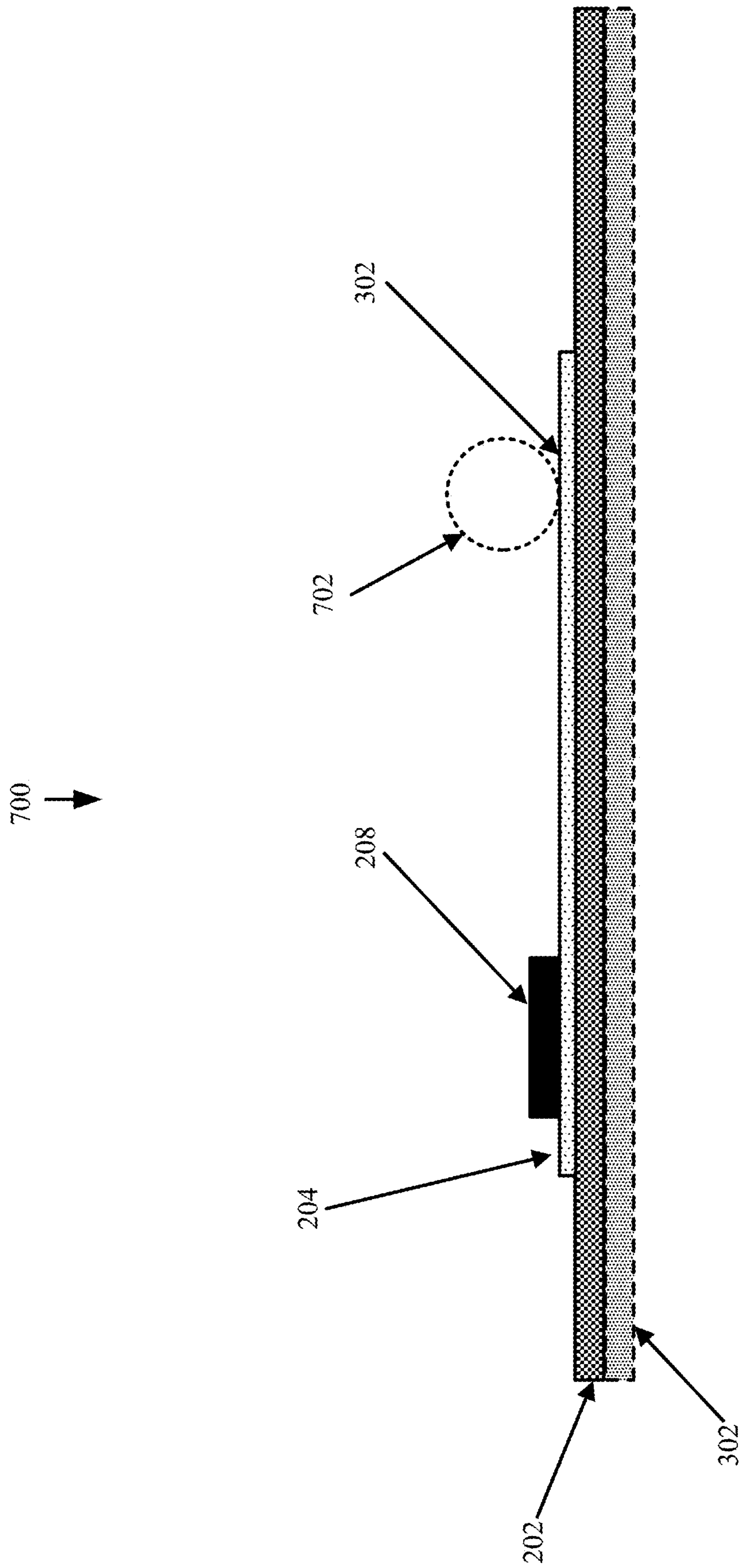
FIG. 8 is a side view of the example architecture of FIG. 7, according to some present aspects.
Figure 9:
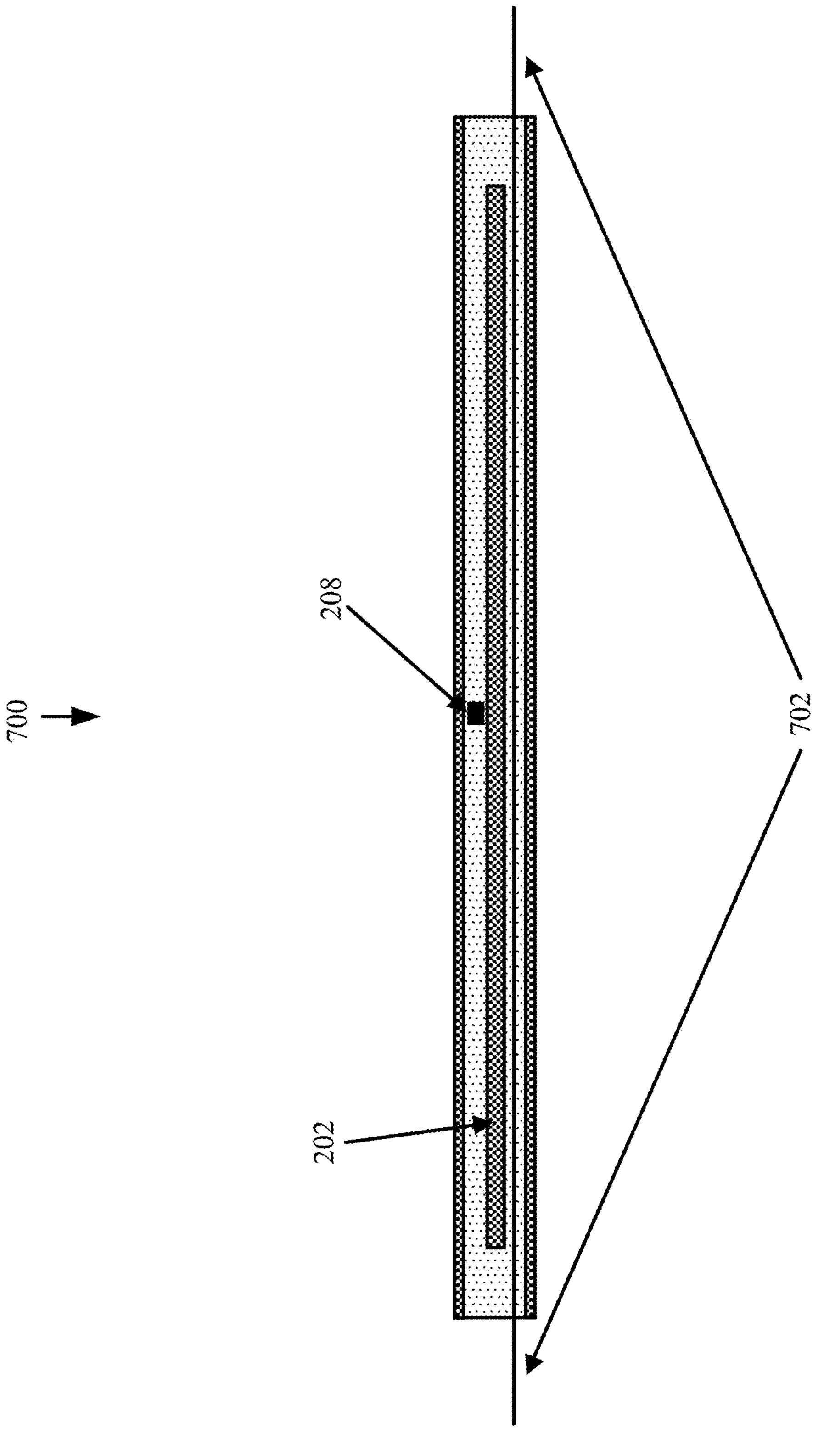
FIG. 9 is a top view of the example architecture of FIG. 7, according to some present aspects.
Figure 10:
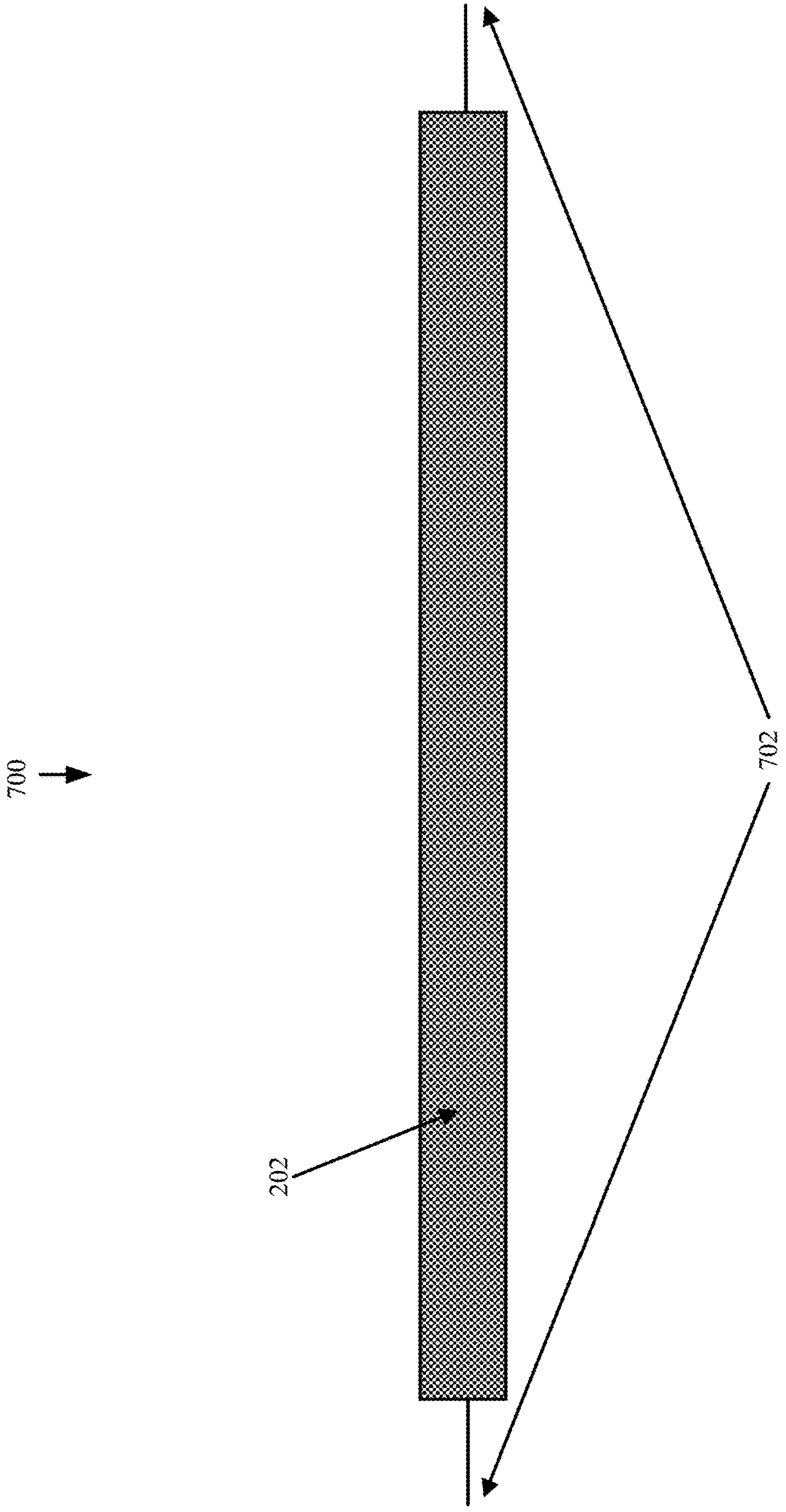
FIG. 10 is a bottom view of the example architecture of FIG. 7, according to some present aspects.
Figure 11:
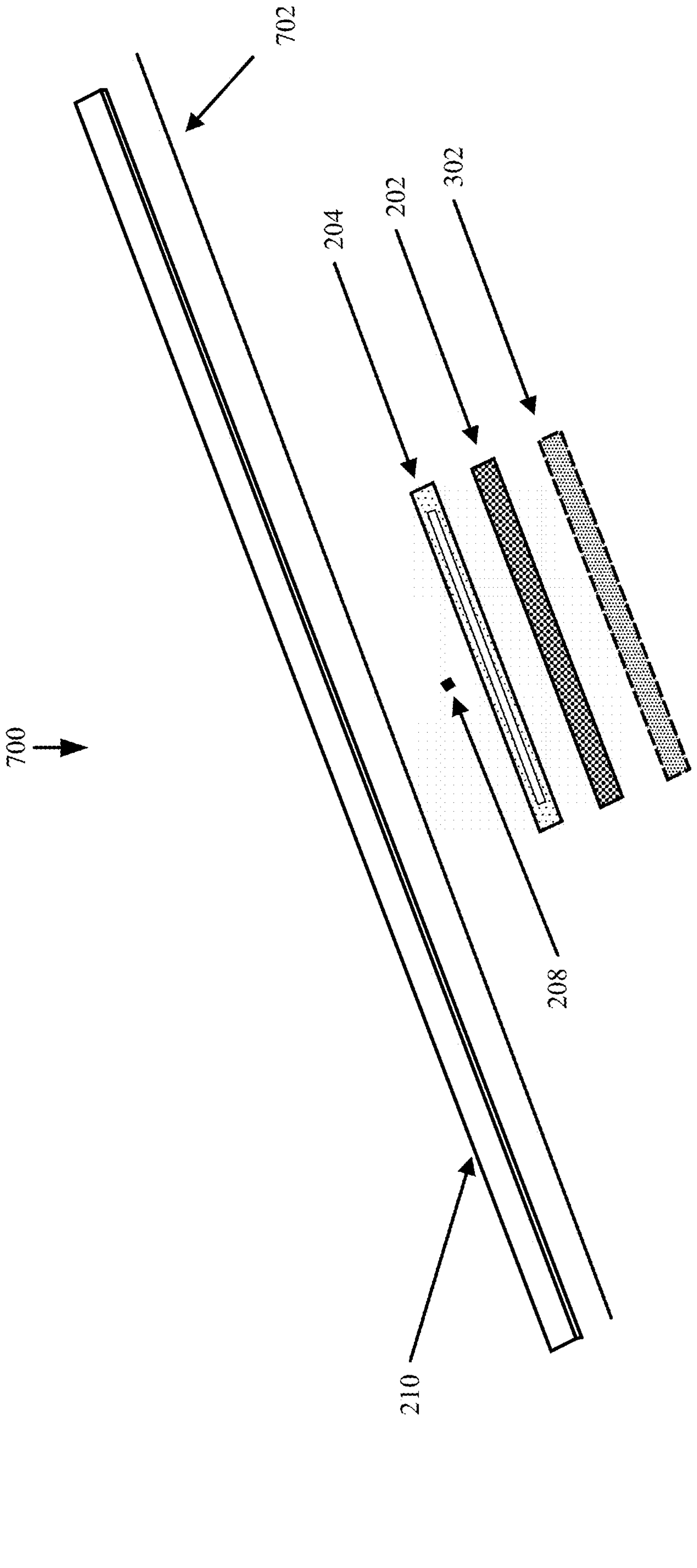
FIG. 11 is an exploded view of the example architecture of FIG. 7, according to some present aspects.

Referring more specifically to FIGS. 3 and 6, in some scenarios, the semiconductor integrated circuit 208, the tunable antenna 204, and the inlay 202 may be coated with a layer of a flexible, fluid resistive material 302 for protecting the same from damage due to fluid exposure. The resistive material may include, but is not limited to, a Thermoplastic Polyurethane (TPU) material, a Polyethylene terephthalate (PET) material, copolyamide, and/or copolyester. Generally, the fluid resistive material may be any waterproof material to protect the electronic components (e.g., by sealing the electronic components hermetically), which can be coated in industrial processes (such as bonded coating) and that is safe and acceptable in textile industry (for example Oeko-tex 100 certified materials). In addition, the selected fluid resistive material should be able to withstand exposure to washing, bleaching and softening chemicals.

The fluid resistive material can be applied to either or both sides of the semiconductor integrated circuit 208, the tunable antenna 204, and the inlay 202. The fluid resistive material can be altered in appearance via a heat source. The appearance may be altered by changing from one color and/or pattern to another one of a variety of colors and/or patterns. In an aspect, the fluid resistive material may be colored or patterned to conceal the electronic components of the inlay 202 from being visible if a thin material is used for the elongated sleeve 210 and if the sleeve 210 does not sufficiently conceal the electronic components.

Figure 5:
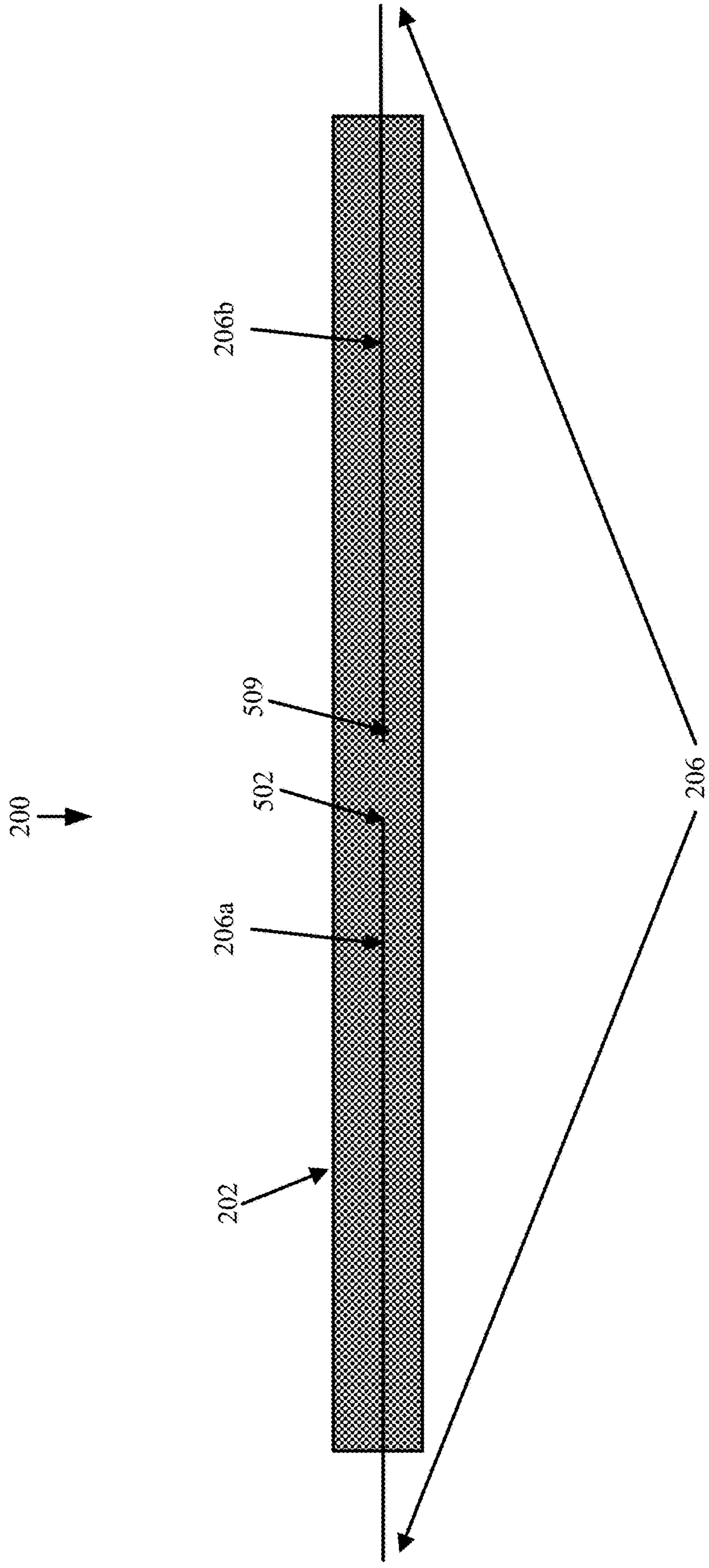
FIG. 5 is a bottom view of the example architecture of FIG. 2, according to some present aspects.

Referring more specifically to FIG. 5, the conductive member 206 is cut or is formed from two spaced apart portions. In an aspect, the spaced apart area between the two portions of the conductive member 206 is adjacent to the semiconductor integrated circuit 208. As such, the conductive member 206 comprises a radiator of the RFID antenna. As listed above, suitable metallic yarns for manufacturing the conductive member 206 include silver coated nylon or polyester yarns or stainless steel yarns such as, for example, Bekinox VN or ShieldEx 117 2 ply with stainless steel yarn, for example. It should be noted that aspects of the disclosure are not to be limited to these specific materials.

Based on this configuration of the conductive member 206, inductive coupling of the conductive member 206 to the loop antenna 204 occurs during operation of the security tag 200. In at least one aspect, the inductive coupling type is based on a principle that a magnetic field generated by high frequency waves from the antenna induces an electric current while passing through the conductive member 206 of the security tag 200, and employed in a 900 MHz frequency band. Further, the inductive coupling type has a feature that the magnetic field is absorbed in metal.

As shown in FIG. 5, the conductive member 206 can be cut substantially in a middle portion of the security tag 200, thereby creating a first portion 206*a* of the conductive member having a first end 502 and a second portion 206*b* of the conductive member having a second end 504. The first end 502 of the first thread portion 206*a* is spaced apart in the longitudinal direction from the second end 504 of the second thread portion 206*b*. In an aspect, this gap may enable significant improvement in sensitivity and performance of the security tag 200.

In summary, the security tag 200 may be produced by combining different material and/or component layers, such as an antenna stripe 204 attached to the inlay 202, the intermediate layer may include a semiconductor integrated circuit 208 electrically connected to a loop antenna 204, both attached to the inlay 202 and electrically connectable with the conductive member 206, such as via inductive coupling, and the outer layer includes an optional plastic material, such as a TPU, and an elongated protective sleeve 210, such as formed from a fabric, that covers the semiconductor integrated circuit 208, the loop antenna 204, and the conductive member 206. The sleeve 210 may comprise an ultrasonically weldable thermoplastic material, such as, but not limited to, nylon, combination of polyester and cotton, and the like. Advantageously, the loop antenna 204 is designed to be very narrow as compared to typical RFID antennas. Although the sleeve 210 in this example is illustrated as a top layer, it should be understood that the outer layer may alternatively or additionally include a bottom layer. In other words, the sleeve 210 is elongated and substantially encapsulates the semiconductor integrated circuit 208, the loop antenna 204, and the conductive member 206. In one implementation, the elongated sleeve 210 includes a single textile sheet having a first longitudinal side fixedly attached to an opposite, second longitudinal side.

It should be understood, however, that the various layers may be manufactured and/or assembled in a different manner and/or in a different order and/or by different entities (e.g., antenna manufacturer, tag manufacturer, tag converter entities).

Referring to FIGS. 7-11, an example of an alternative architecture for a security tag 700 is similar to security tag 200, e.g., formed as described above with respect to components the layers 202, 204, 206 and 210. However, in this exemplary architecture the conductive member 702 is continuous. It should be noted that generally, the conductive member 206 having a gap substantially in the middle (between the first portion 206*a* and the second portion 206*b*) shown in FIG. 5 may provide better performance than the conductive member 702 that is continuous.

It should be understood, however, that the various layers may be manufactured and/or assembled in a different manner and/or in a different order and/or by different entities (e.g., antenna manufacturer, tag manufacturer, tag converter entities). Thus, the methods and structures herein provide a flexible, fabric-like narrow security tag 200 that can be easily and efficiently attached (sewn) into a space between seams that connect two adjacent layers of material of an article of clothing. The two layers of the article of clothing may be stitched together by overlock stitches. However, in various aspects, the security tag 200 may be sewn, glued or welded onto any other portion of an article of clothing.

Figure 12:
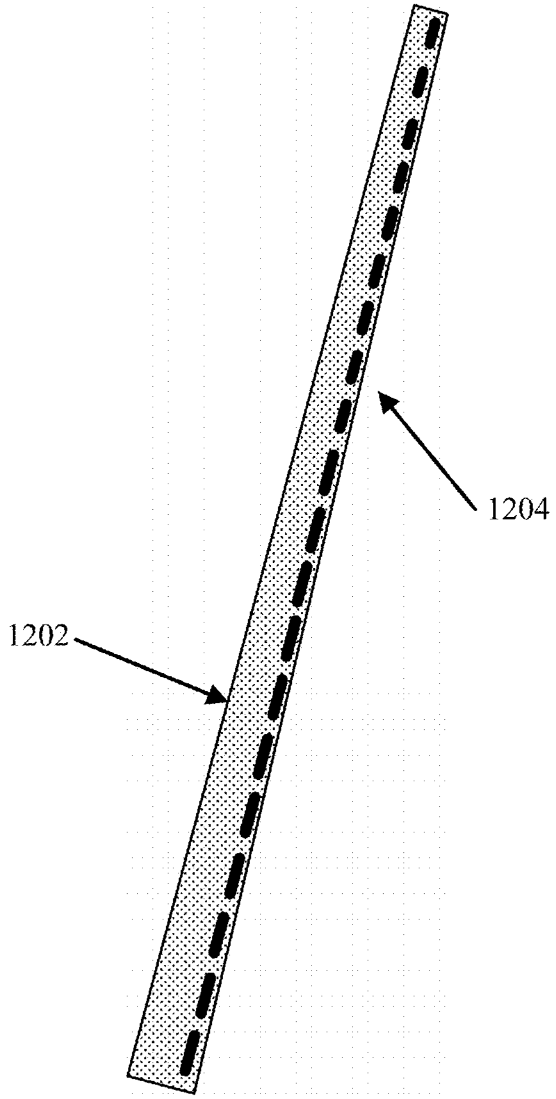
FIG. 12 is a perspective view of an example tag having a welded-on sleeve, according to some present aspects.

Referring to FIG. 12, a completed welded security tag, such a security tag 200 (or security tag 700) includes the electronic components being positioned on one side 1202 off a center of the security tag 200, so that a continuous stitching lane 1204 may be created for secure attachment of the security tag 200 to an article of clothing. In other words, since the electronic components are situated on one side of the security tag 200, they are less likely to be damaged by sewing needles when the security tag 200 is attached to an article of clothing.

Figure 13:
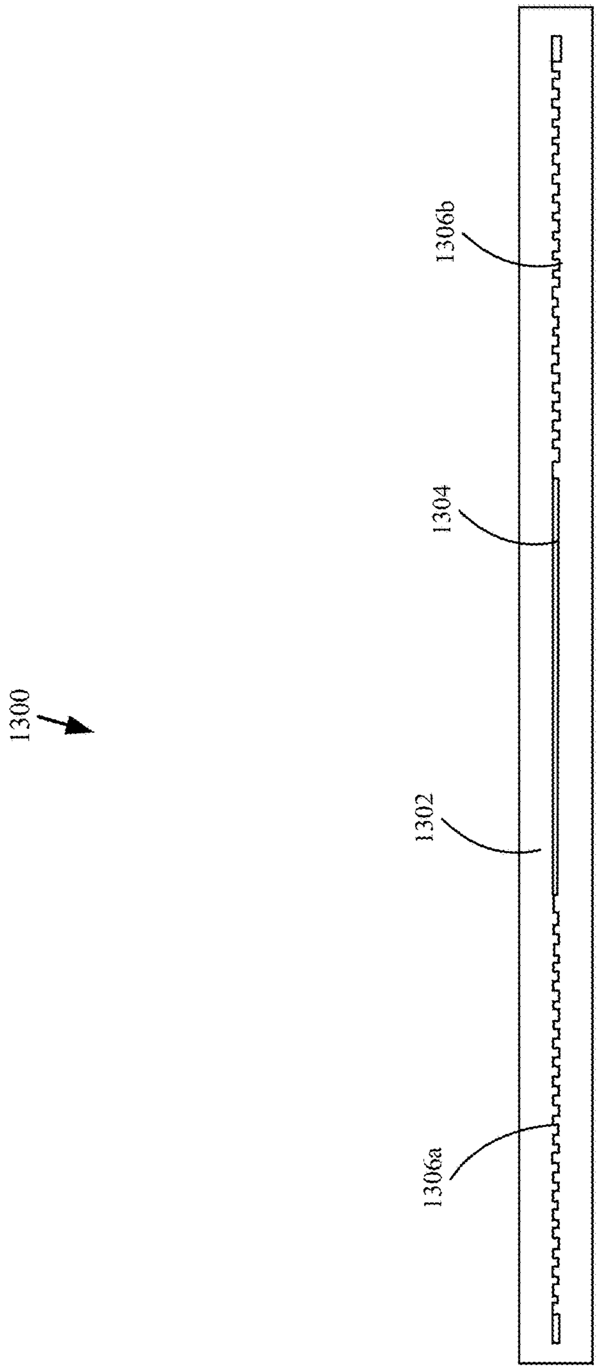
FIG. 13 is a top view of yet another alternative example architecture for a tag, according to some present aspects.

FIG. 13 is a top view of yet another alternative architecture for a tag according to some present aspects.

The security tag 1300 illustrated in FIG. 13 is similar to security tags 200 and 700 described herein. In an aspect, the security tag 1300 may also have a narrow and long shape. In an aspect, an elongated sleeve (not shown in FIG. 13) substantially encapsulates the inlay 1302, impedance matching loop portion of the antenna 1304, and dipole radiator regions of the antenna 1306. In one implementation, the elongated sleeve includes a single textile sheet having a first longitudinal side fixedly attached to an opposite, second longitudinal side. The inlay 1302 may comprise an RFID dipole inlay portion. The electrically conductive elements, such as the antenna 1306 is generally an electrically conductive thin strip made of, for example, an etched metal such as aluminum or copper. In an aspect, a semiconductor integrated circuit may be mounted directly to the impedance matching loop portion of the antenna 1304. A first dipole radiator region 1306*a* and a second dipole radiator region 1306 may extend longitudinally from the loop portion 1304 across opposite sides of the elongated inlay portion 1302.

Further, for example but not limited hereto, a width of the security tag 1300 can be about 0.5 mm, and a length of the security tag 1300 can be about 94 mm which is small enough so that the tag is not felt by humans when inserted into an item. In some aspects, the inlay 1302 may comprise a PET substrate. In an aspect, a width of the security tag 1300 may be about 2 mm, wherein the distance between the antenna portion 1304, 1306) and each of opposite edges of the inlay portion 1302 is about 0.75 mm. The present aspects are not limited to the particulars of this example.

The disclosed aspects provide a soft, easy to attach, discreet, high-performing, durable, and economical RFID security tag. In an aspect, such a tag can be attached to an overlock seam of the article. The disclosed aspects replace a majority of a PET inlay with conductive textile fiber antenna in the core of a fabric sleeve. Advantageously, the disclosed aspects enable tagging of thin, lightweight, one-ply garments, which are difficult to tag with any existing tagging solutions. As yet another advantage, the disclosed tag provides better feel, appearance and performance, as compared to conventional security tags. Further, for example, the described aspects may be implemented as an RFID tag which can be embedded in clothing (or other textile items) and used for RFID inventory management, RFID loss prevention (anti-theft), RFID assisted Self-Checkout, e-commerce, and RFID-assisted returns management. The RFID tag can be embedded in clothing discreetly, including on thin and lightweight one-ply garments. Alternatively or additionally, the RFID tag can be attached to an article using an insertion process that is efficient and utilizes existing processes. Alternatively or additionally, the RFID tag can withstand industrial washing processes utilized in the clothing manufacture process. Alternatively or additionally, the RFID tag is conformable and has a textile feel, making it comfortable for a wearer of the clothing item. Alternatively or additionally, the RFID tag has a relatively high RF performance (compared to other flexible tags). Alternatively or additionally, the RFID tag can be formed using existing manufacturing processes and the materials and manufacturing processes used to make the tag may be economical.

In other words, one aspect of the security tag includes: an elongated inlay portion; a loop antenna mounted on the elongated inlay portion; an electrically-conductive member longitudinally extending across the elongated inlay portion, spaced apart from and inductively coupled to the loop antenna; and a radio frequency identifier (RFID) circuit mounted to the loop antenna. The security tag is encapsulated within an elongated textile protective sleeve.

In one or any combination of these aspects, the electrically-conductive member has a first longitudinal length substantially greater than a second longitudinal length of the elongated inlay portion and a third longitudinal length of the loop antenna.

In one or any combination of these aspects, the second longitudinal length of the elongated inlay portion and the third longitudinal length of the loop antenna are substantially equal.

In one or any combination of these aspects, the electrically-conductive member extends continuously across the security tag.

In one or any combination of these aspects, the electrically-conductive member extends along the security tag in a longitudinal direction, wherein the electrically-conductive member comprises a first thread portion having a first end and a second thread portion having a second end, and wherein the first end of the first thread portion is spaced apart in the longitudinal direction from the second end of the second thread portion.

In one or any combination of these aspects, the electrically-conductive member includes at least one of: an electrically-conductive thread, electrically conductive fiber, yarn, printed ink, conductive fabric, wire, or metallic stripe.

In one or any combination of these aspects, the electrically-conductive member includes nylon coated with silver.

In one or any combination of these aspects, the elongated textile protective sleeve includes a single textile sheet having a first longitudinal side fixedly attached to an opposite, second longitudinal side.

In one or any combination of these aspects, the loop antenna, the electrically-conductive member and the RFID circuit are positioned on one side off a center of the security tag.

In one or any combination of these aspects, the elongated textile protective sleeve includes a single textile sheet having a first longitudinal side fixedly attached to an opposite, second longitudinal side on a first longitudinal tag side off a center of the security tag. The loop antenna, the electrically-conductive member, and the RFID circuit are positioned on a second longitudinal tag side opposite the first longitudinal tag side.

In one or any combination of these aspects, the security tag further includes a coating layer that at least partially covers the RFID circuit and the loop antenna.

In one or any combination of these aspects, the coating layer includes a plastic material layer.

In one or any combination of these aspects, the security tag is configured to be positioned into an interface space between two layers of an article of clothing.

In one or any combination of these aspects, the security tag is configured to be positioned on top of an overlock seam of an article of clothing.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A flexible security tag, comprising:

an elongated inlay portion;

a loop antenna mounted on the elongated inlay portion;

an electrically-conductive member longitudinally extending across the elongated inlay portion, spaced apart from and inductively coupled to the loop antenna, wherein the electrically-conductive member has a first longitudinal length in a longitudinal direction, wherein the first longitudinal length is greater than a second longitudinal length of the elongated inlay portion in the longitudinal direction; and a radio frequency identifier (RFID) circuit mounted to the loop antenna, wherein the flexible security tag is encapsulated within an elongated textile protective sleeve, wherein the flexible security tag is configured to be positioned into:

an interface space between two layers of an article of clothing, the interface space extending along the longitudinal direction; and/or on top of an overlock seam of the article of clothing, the overlock seam extending along the longitudinal direction.

2. The flexible security tag of claim 1, wherein the first longitudinal length of the electrically-conductive member is greater than a third longitudinal length of the loop antenna.

3. The flexible security tag of claim 2, wherein the second longitudinal length of the elongated inlay portion and the third longitudinal length of the loop antenna are equal.

4. The flexible security tag of claim 1, wherein the electrically-conductive member extends continuously across the flexible security tag.

5. The flexible security tag of claim 1, wherein the electrically-conductive member extends along the flexible security tag in the longitudinal direction, wherein the electrically-conductive member comprises a first thread portion having a first end and a second thread portion having a second end, and wherein the first end of the first thread portion is spaced apart in the longitudinal direction from the second end of the second thread portion.

6. The flexible security tag of claim 1, wherein the electrically-conductive member comprises at least one of: an electrically-conductive thread, electrically conductive fiber, yarn, printed ink, conductive fabric, wire or metallic stripe.

7. The flexible security tag of claim 5, wherein the electrically-conductive member comprises nylon coated with silver.

8. The flexible security tag of claim 1, wherein the elongated textile protective sleeve comprises a single textile sheet having a first longitudinal side fixedly attached to an opposite, second longitudinal side.

9. The flexible security tag of claim 1, wherein the loop antenna, the electrically-conductive member and the RFID circuit are positioned on one side off a center of the flexible security tag.

10. The flexible security tag of claim 1, wherein the elongated textile protective sleeve comprises a single textile sheet having a first longitudinal side fixedly attached to an opposite, second longitudinal side on a first longitudinal tag side off a center of the flexible security tag, and wherein the loop antenna, the electrically-conductive member, and the RFID circuit are positioned on a second longitudinal tag side opposite the first longitudinal tag side.

11. The flexible security tag of claim 1, further comprising a coating layer that at least partially covers the RFID circuit and the loop antenna.

12. The flexible security tag of claim 11, wherein the coating layer comprises a plastic material layer.

13. A flexible security tag, comprising:

an elongated inlay portion;

a loop antenna mounted on the elongated inlay portion;

an electrically-conductive member longitudinally extending across the elongated inlay portion and spaced apart from and inductively coupled to the loop antenna, wherein the electrically-conductive member has a first longitudinal length that in a longitudinal direction, wherein the first longitudinal length is greater than a second longitudinal length of the elongated inlay portion in the longitudinal direction; and a radio frequency identifier (RFID) circuit mounted to the loop antenna, wherein the flexible security tag is configured to be positioned into:

an interface space between two layers of an article of clothing, the interface space extending along the longitudinal direction; and/or on top of an overlock seam of the article of clothing, the overlock seam extending along the longitudinal direction.

14. The flexible security tag of claim 13, wherein the flexible security tag is encapsulated within an elongated textile protective sleeve.

15. The flexible security tag of claim 13, wherein the first longitudinal length of the electrically-conductive member is greater than a third longitudinal length of the loop antenna.

16. The flexible security tag of claim 15, wherein the second longitudinal length of the elongated inlay portion and the third longitudinal length of the loop antenna are equal.

17. The flexible security tag of claim 13, wherein the electrically-conductive member extends continuously across the flexible security tag.

18. The flexible security tag of claim 13, wherein the electrically-conductive member extends along the flexible security tag in the longitudinal direction, wherein the electrically-conductive member comprises a first thread portion having a first end and a second thread portion having a second end, and wherein the first end of the first thread portion is spaced apart in the longitudinal direction from the second end of the second thread portion.

19. A flexible security tag, comprising:

an elongated inlay portion having a first longitudinal length in a longitudinal direction;

a loop antenna mounted on the elongated inlay portion and having a second longitudinal length in the longitudinal direction;

an electrically-conductive member longitudinally extending across the elongated inlay portion and spaced apart from and inductively coupled to the loop antenna and having a third longitudinal length in the longitudinal direction, the third longitudinal length being greater than the first longitudinal length and the second longitudinal length, causing the electrically-conductive member to longitudinally extend beyond the elongated inlay portion and the loop antenna; and a radio frequency identifier (RFID) circuit mounted to the loop antenna, wherein the flexible security tag is configured to be positioned into:

an interface space between two layers of an article of clothing, the interface space extending along the longitudinal direction; and/or on top of an overlock seam of the article of clothing, the overlock seam extending along the longitudinal direction.

* * * * *